Patented Nov. 7, 1939

2,178,742

UNITED STATES PATENT OFFICE 2,178,742

PLUMBITE SOLUTION

Joseph E. Drapeau, Jr., Hammond, Ind., assignor to The Glidden Company, Cleveland, Ohio, a corporation of Ohio No Drawing. Application July 24, 1935, Serial No. 32,931

5 Claims. (Cl. 252—1)

This invention relates to plumbite solutions of the type formed by dissolving lead oxide in caustic alkalies, and has particular reference to new plumbite solutions and the process of producing them, which comprises dissolving the lead oxide in caustic alkali solution in the presence of an agent which retards crystallization of lead oxide from the solutions. More particularly, it refers to plumbite solutions in which crystallization of lead oxide is retarded by the use of a water-soluble polyhydroxy organic compound.

Sodium plumbite, and other alkali plumbites, have been much used as "doctor" solutions for the removal of sulphur in the refining of petroleum oils. The solutions are ordinarily made by dissolving litharge in a caustic soda solution; and as a matter of conventional prior art practice, the solutions generally comprise 3.5 grams of litharge in 100 grams of 20° Baumé caustic soda solution, this being a saturated solution at about 20° C.

In order to reduce the cost of the refining operation, which depends largely on the lead content of the treating solution, it has been suggested that the concentration of lead in the caustic soda solution be increased by using battery scrap, treated so as to convert the antimonial lead of the scrap to litharge containing lead antimoniate (Kirk, United States Patent 1,977,993, October 23, 1934). This treatment does increase the lead solubility to a considerable degree, doubling the solubility, and permitting solutions containing 7.0 grams litharge per 100 grams of 20° Baumé caustic soda to be made. This method, however, introduces inerts such as lead sulphate and lead carbonate into the caustic soda solution to the extent of about 4–6%, causing carbonation of the caustic solution and sludging of the insoluble inerts. As a result, caustic is lost; and it is necessary to filter off the sludge.

I have discovered that apparently increased solubility of the litharge can be obtained, without the necessity for adding large quantities of impurities, by adding to the solution a small quantity of a catalyst of the class of water-soluble polyhydroxy organic compounds. I have further investigated this apparently increased solubility and have discovered that the effect is not an increase in solubility, but the production of stable super-saturated solutions.

When litharge is treated with caustic soda solution at 20° C., a solution of 3.5 grams per 100 grams of solution can be obtained. If the temperature be increased, the solubility becomes greater, the following table indicating the solubilities of litharge in 20° Baumé caustic soda solution, solubilities being expressed as grams litharge per 100 grams of solution.

TABLE I.—*Solubility of litharge at various temperatures*

| Temperature | Solubility |
|---|---|
| 20° C | 3.5 |
| 30° C | 4.0 |
| 40° C | 4.3 |
| 50° C | 5.6 |
| 60° C | 6.5 |
| 80° C | 7.3 |
| 90° C | 7.5 |
| 100° C | 7.6 |

When litharge is treated with hot caustic solution, easy solubility is thus obtained, but as the temperature drops, crystallization occurs if too much litharge has been added.

If there be added to the litharge various addition agents, there is no change in the solubility at any given temperature. The following table illustrates this point:

TABLE II.—*Solubility of litharge plus addition agents at 20° C.*

| Grams litharge | Addition agent | Solubility in 100 grams 20° Baumé caustic soda |
|---|---|---|
| 10.0 | None | 3.50 |
| 10.0 | 0.25 sucrose | 3.45 |
| 10.0 | 0.25 tartaric acid | 3.55 |
| 10.0 | 0.10 glycerol | 3.45 |
| 10.0 | 0.25 dextrose | 3.55 |
| 10.0 | 0.25 NaK tartrate | 3.35 |
| 10.0 | Litharge made by Kirk process | 3.0 |

If, however, the same procedure as used for Table II be followed out, except that the litharge be treated at 100° C., and cooled to 20° C., the caustic soda solutions contain considerably higher percentages of litharge, as indicated in Table III:

TABLE III.—*Solubility of litharge plus addition agents, treating at 100° C. and cooling to 20° C.*

| Grams litharge | Addition agent | Solubility in 100 grams 20° Baumé caustic soda |
|---|---|---|
| 3.5 | None | 3.35 |
| 7.0 | ----do---- | 3.45 |
| 10.0 | ----do---- | 3.60 |
| 3.5 | Kirk's process | 2.95 |
| 7.0 | ----do---- | 6.25 |
| 10.0 | ----do---- | 6.50 |
| 10.0 | 0.025 tartaric acid | 4.75 |
| 10.0 | 0.10 tartaric acid | 6.25 |
| 10.0 | 0.25 tartaric acid | 6.40 |
| 10.0 | 0.10 glycerol | 6.00 |
| 10.0 | 0.10 dextrose | 5.80 |
| 10.0 | 0.25 dextrose | 6.00 |
| 10.0 | 0.10 sucrose | 6.30 |
| 10.0 | 0.25 sucrose | 6.70 |
| 10.0 | 0.125 sucrose | 6.45 |
| 10.0 | 0.25 hydroquinine | 5.65 |
| 10.0 | 0.025 hydroquinine | 4.05 |
| 10.0 | 0.25 NaK tartrate | 5.40 |
| 10.0 | 0.15 starch | 2.95 |
| 10.0 | 0.15 paper fiber | 3.05 |
| 10.0 | 0.10 starch | 3.90 |

I believe the action of these agents, therefore, to be that of preventing crystallization, by stabilizing the super-saturated solution of lead oxide in caustic soda.

It will be noted that all of the addition agents are polyhydroxy organic compounds, comprising polyhydroxy acids, salts of polyhydroxy acids, polyhydroxy alcohols, and polyhydroxy phenols, and saccharoses. Starch and cellulose, however, do not work; I attribute this to the fact that they are not water-soluble, even the so-called "soluble" starch being merely a colloidal dispersion in water.

The addition agents may be added by mixing the dry powder with the litharge, or by dissolving them in the caustic soda solution.

By the use of water-soluble polyhydroxy organic compounds, it is thus possible to obtain higher concentration of lead oxide in the "doctor" solution, permitting of economy in operation, by the saving in the cost of caustic soda, and less handling. In addition, it has advantages over the Kirk process, in that carbonation of the caustic is eliminated, and there is no sludge to remove when the "doctor" solution is prepared.

Another advantage of the use of my addition agents lies in the fact that they inhibit crystallization of litharge on sudden temperature changes. Thus, a "doctor" solution, saturated at 20° C., if exposed to low temperatures would deposit litharge in pipe lines, tanks, etc.; while a similar solution containing one of my addition agents would retain the litharge in super-saturated solution.

While I have indicated certain preferred concentrations of caustic soda solution, changes can be made without departing from the spirit of my invention. Similarly, the lead may enter the plumbite solution from some source other than litharge; and I consider the other alkali hydroxides chemical equivalents of the caustic soda for the purpose of making plumbite solutions.

The amounts of addition agent can be varied considerably, as indicated in Table III. Increased lead content can be obtained by the use of as low as 0.25% tartaric acid, or hydroquinine; and I have used as high as 5.0% in some cases, although in all of my experiments maximum effect has been obtained at or below 3%.

I claim:

1. A sodium plumbite doctor solution containing a higher percentage of sodium plumbite than can normally be maintained in aqueous solution under the same conditions comprising a solution of litharge in an excess of caustic soda over that necessary to form sodium plumbite with the litharge, and between 0.25% and 5%, based on the litharge content, of a water soluble polyhydroxy compound selected from the class consisting of water soluble polyhydroxy acids, water soluble salts of polyhydroxy acids in which the cations consist of monovalent ions, water soluble polyhydroxy alcohols, water soluble polyhydroxy phenols and water soluble saccharoses.

2. The composition of claim 1 in which the percentage of the water soluble polyhydroxy compound is 3% or less of the litharge content.

3. The composition of claim 1 in which the water soluble polyhydroxy compound is a water soluble saccharose.

4. The composition of claim 1 in which the water soluble polyhydroxy compound is a water soluble polyhydroxy alcohol.

5. The composition of claim 1 in which the water soluble polyhydroxy compound is a water soluble polyhydroxy phenol.

JOSEPH E. DRAPEAU, Jr.